(12) United States Patent
Webster

(10) Patent No.: US 7,249,769 B2
(45) Date of Patent: Jul. 31, 2007

(54) SEAL APPARATUS

(75) Inventor: John R Webster, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/166,727

(22) Filed: Jun. 27, 2005

(65) Prior Publication Data

US 2005/0285345 A1 Dec. 29, 2005

Related U.S. Application Data

(63) Continuation of application No. 09/987,322, filed on Nov. 14, 2001, now abandoned.

(30) Foreign Application Priority Data

Nov. 22, 2000 (GB) ................................ 0028408.3

(51) Int. Cl.
*F01D 11/02* (2006.01)
(52) U.S. Cl. .................. 277/411; 277/410; 277/421; 277/412
(58) Field of Classification Search ........ 277/409–413, 277/416, 418, 421, 422, 500, 501
See application file for complete search history.

(56) References Cited

U.S. PATENT DOCUMENTS

| | | | | | |
|---|---|---|---|---|---|
| 3,971,563 | A | * | 7/1976 | Sugimura | 277/413 |
| 4,434,987 | A | * | 3/1984 | Albers et al. | 277/317 |
| 5,064,205 | A | * | 11/1991 | Whitford | 277/317 |
| 5,137,286 | A | * | 8/1992 | Whitford | 277/410 |
| 5,603,510 | A | * | 2/1997 | Sanders | 277/413 |
| 5,700,011 | A | * | 12/1997 | Bainachi et al. | 277/422 |
| 6,220,602 | B1 | * | 4/2001 | Webster et al. | 277/410 |
| 6,431,550 | B1 | * | 8/2002 | Tong | 277/346 |

\* cited by examiner

*Primary Examiner*—Chuck Y. Mah
*Assistant Examiner*—Michael J. Kyle
(74) *Attorney, Agent, or Firm*—W. Warren Taltavull; Manelli Denison & Selter PLLC

(57) ABSTRACT

A seal (40) provides sealing between two pressure zones (60, 62) and a rotating and non-rotating member (42, 52) by providing a first sealing member (46) between two seal lands (48, 50). A second seal (64) is mounted between the non-rotating member (52, 58) and one of the seal lands (50, 66) so as to control pressure around the seal lands (48, 50).

9 Claims, 5 Drawing Sheets

SEAL APPARATUS

This is a continuation of application Ser. No. 09/987,322 filed Nov. 14, 2001 now abandoned.

FIELD OF THE INVENTION

This invention relates to seal apparatus. More specifically but not exclusively this invention relates to a seal for sealing between one rotating member and one static member.

BACKGROUND OF THE INVENTION

It is frequently necessary to seal a clearance gap between two components that are capable of relative movement. In particular one or more seals are often required to provide a seal between a rotatable shaft and an axially adjacent static component. For example, a gas turbine engine comprises shafts which rotate at relatively high speeds and which are exposed to pressurised hot gases. Seals are required between rotating rotor blades and surrounding static casing structure.

Seals are also required between a rotor carrying such rotor blades and an adjacent static structure which carries stator vanes or nozzle guide vanes. In a gas turbine engine nozzle guide vanes or stator vanes are non-rotating and as such mounted on a static structure.

It is also important to provide such seals to prevent hot pressurised gas in one pressure zone flowing freely into an adjacent lower pressure zone.

It is well known to provide labyrinth seals to seal between rotating and non-rotating members, however large clearances are required at some engine operating conditions to accommodate relative movement. It is desirable to reduce or alter these clearances at certain operating conditions to achieve the most effective power output of the engine.

It is also a requirement of such seals that an acceptable clearance gap is provided at all the differing engine conditions. Such seals between rotating and non-rotating members are not required to provide a complete closed seal but are required to provide a seal with a predetermined clearance range.

Thermal expansion and changes in pressure conditions can also cause unbalanced forces on the seal and affect the seals effectiveness. It is therefore important that the clearance between the non-rotating part of the seal and its static part is kept within a predetermined range.

SUMMARY OF THE INVENTION

It is therefore an aim of the present invention to provide an improved seal which may also alleviate the aforementioned problems.

According to the present invention there is provided a seal for providing sealing between at least two separate and differing pressure zones and between a rotating structure and non-rotating structures, comprising first and second sealing means, the first sealing means comprising first and second seal lands positioned either side of a rotating seal member, said seal lands being connected together via connecting means, said connecting means being movably mounted on said non-rotating structure and arranged to be moveable so as to accommodate relative movement of said rotating and non-rotating structures, said second seal member being arranged and positioned to provide a seal between said non-rotating structure and the first seal land positioned in a lower pressure zone such that the pressure around this seal land is controlled.

The seal lands may comprise two opposing magnets arranged to repel one another.

Preferably the sealing lands comprise rings.

Also preferably the sealing member comprises a rotating sealing fin attached to a rotor of a gas turbine engine.

The connecting means may comprise a yoke.

The yoke may be connected to the non-rotating member by a first pivot, allowing rotational movement of the yoke.

The opposing faces of the seal lands may comprise reduced area portion positioned opposite one another.

BRIEF DESCRIPTION OF THE DRAWINGS

Embodiments of the present invention are described below with reference to the accompanying drawings in which.

DETAILED DESCRIPTION OF THE INVENTION according to the present invention.

Figure 1:
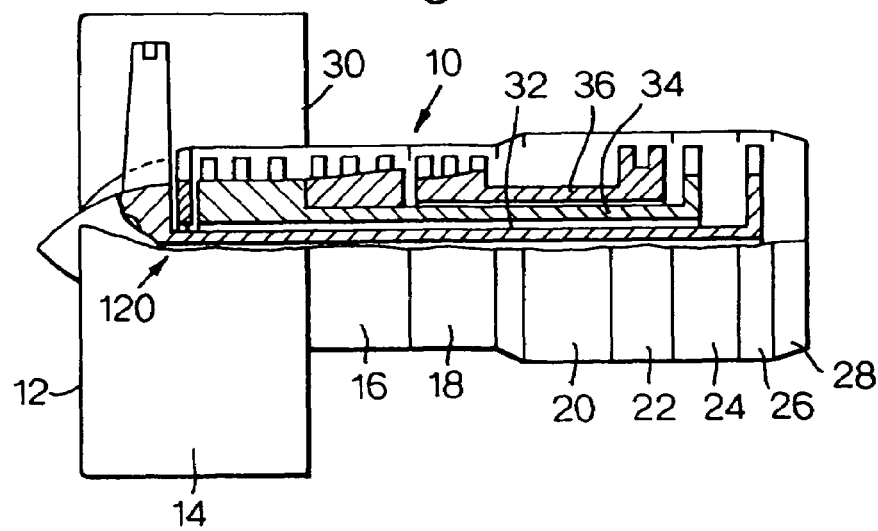
FIG. 1 is a partially cut-away view of a turbo fan gas turbine engine having one or more seals according to the present invention.

A gas turbine engine 10 is shown in FIG. 1 and comprises in axial flow series, an intake 12, a fan section 14, an intermediate pressure compressor section 16, a high pressure compressor section 18, a combustion section 20, a high pressure turbine section 22, an intermediate pressure turbine section 24, a low pressure turbine section 26 and an outlet 28. The fan section 14 has a fan outlet 30 to provide bypass flow. The low pressure turbine section 26 is arranged to drive the fan section 14 by a first shaft 32, the intermediate pressure turbine section 24 is arranged to drive the intermediate pressure compressor section 16 by a shaft 34 and the high pressure turbine section 26 is arranged to drive the high pressure compressor section 18 by a shaft 36.

The gas turbine engine 10 operates conventionally in that air is compressed as it flows through the fan section 14, the intermediate pressure compressor section 16 and the high pressure compressor section 18. The air is then delivered into the combustion section 20 and fuel is injected into the combustion section 20 and burnt in the air to produce hot gases. These hot gases flow through and drive the high pressure turbine section 22, the intermediate pressure turbine section 24 and the low pressure turbine section 26. The hot gases then flow through the outlet 28 to provide some thrust. However, the main thrust is provided by the air compressed by the fan section 14 and discharged through the fan outlet 30.

A seal arrangement 40 is described below with respect to a gas turbine engine, although it is to be appreciated that the seal is suitable for any application between relatively moveable components where sealing is required.

Figure 2:
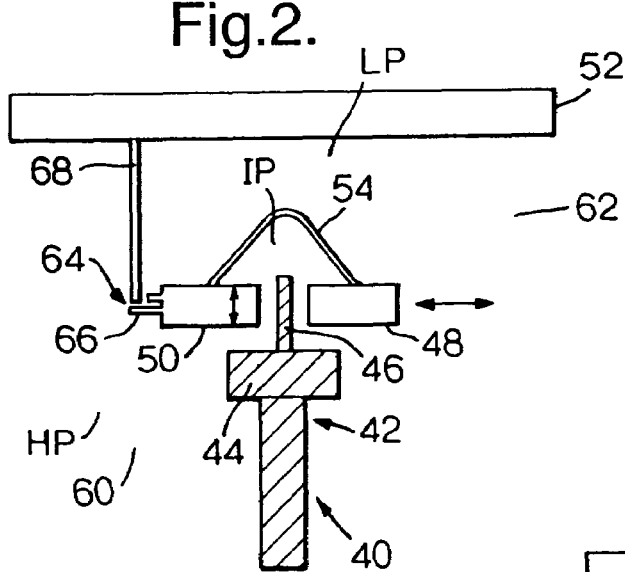
FIG. 2 is an illustration of the general concept of the present invention.
Figure 3:
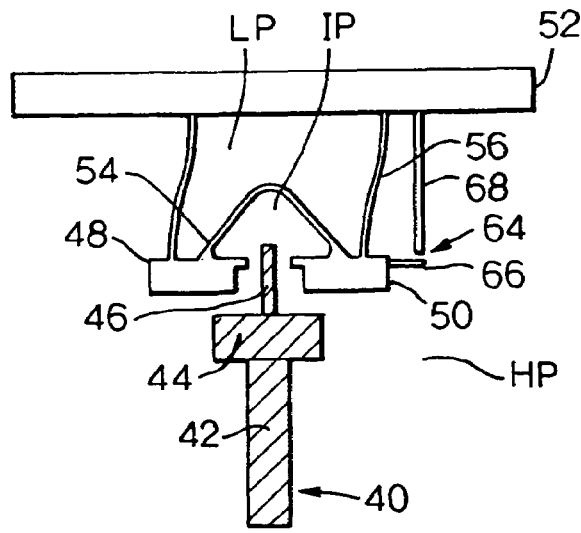
FIG. 3 is another illustration of a general concept of the present invention.
Figure 4:
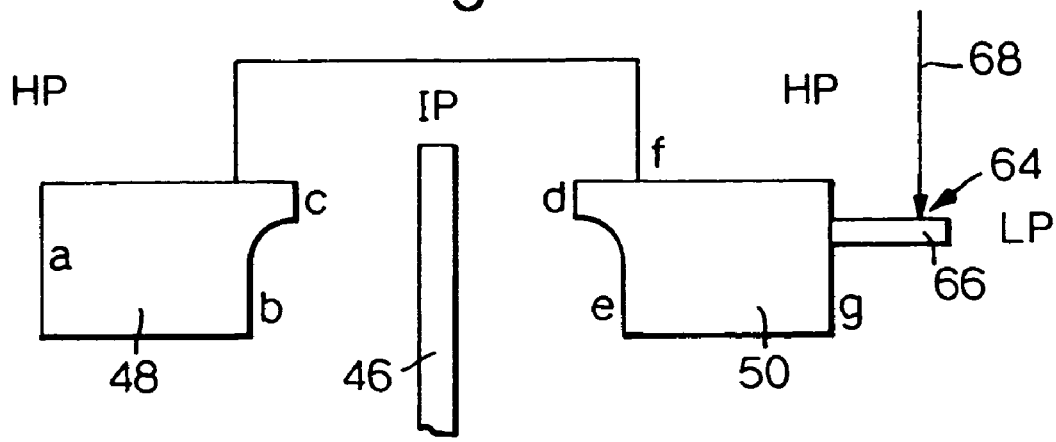
FIG. 4 is another illustration of the general concept of the present invention.
Figure 5:
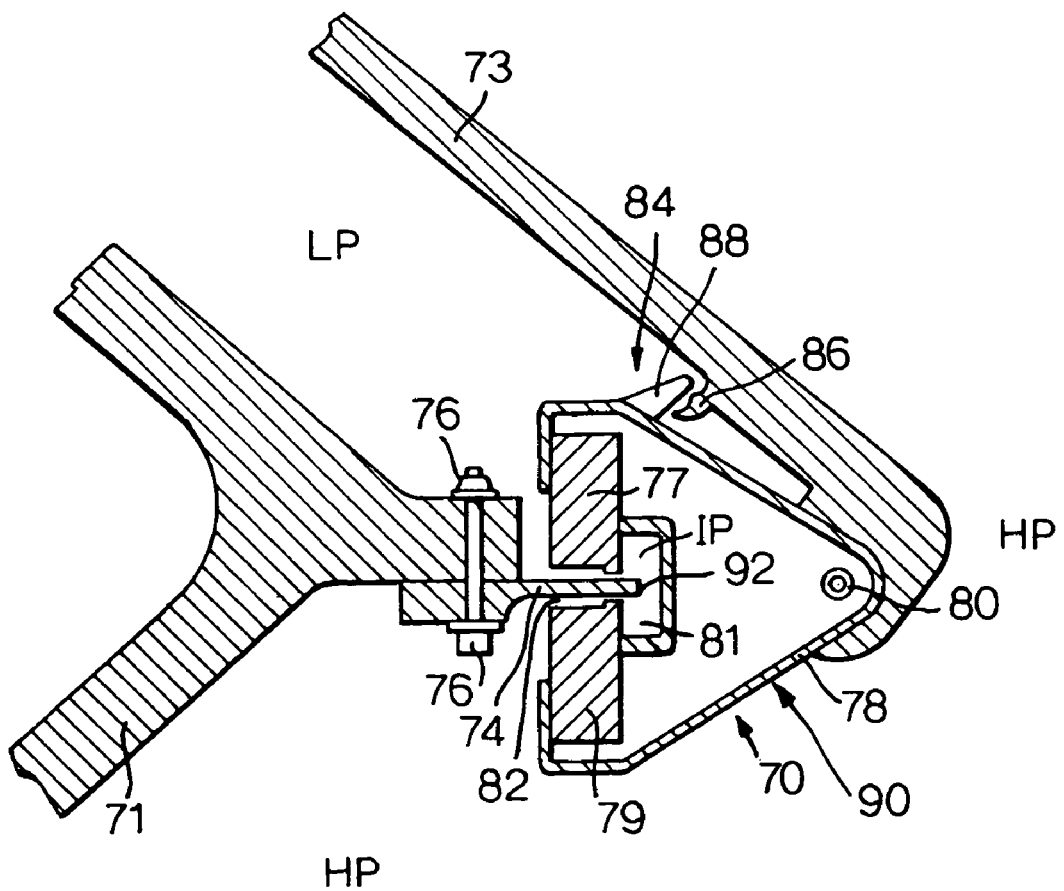
FIG. 5 is a sectional view through a compressor rotor and adjacent stator incorporating a seal according to a embodiment of the present invention.
Figure 6:
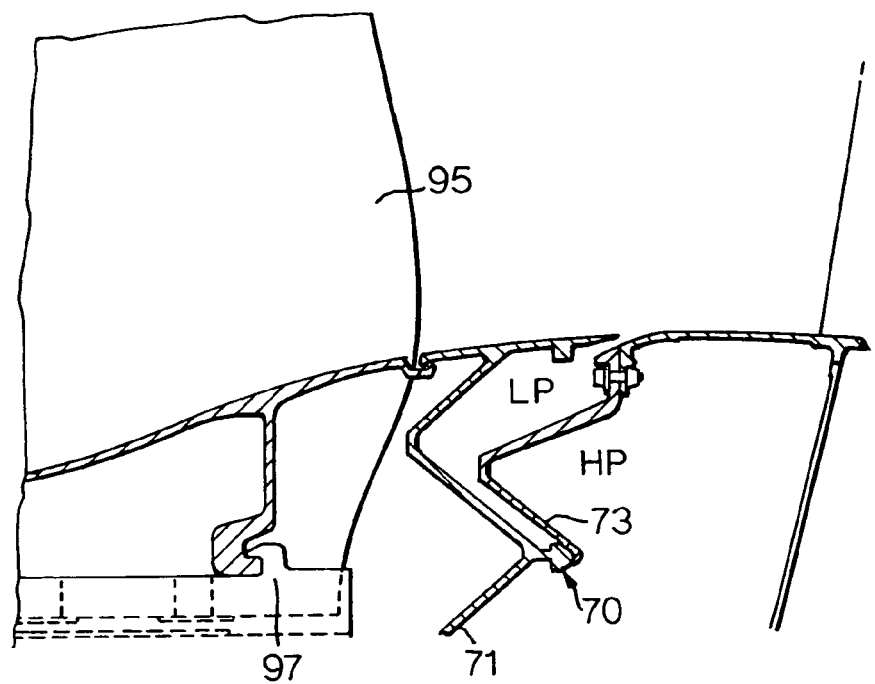
FIG. 6 is a view of FIG. 5 illustrating a seal's position in a gas turbine engine.
Figure 7:
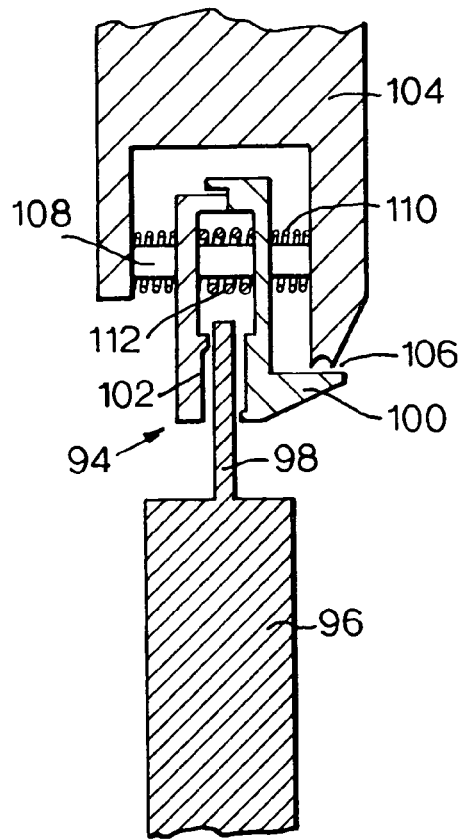
FIG. 7 is a diagrammatic view of a further embodiment of the present invention.

FIGS. 2, 3 and 4 are provided to explain the general concept of the present invention. Embodiments of the present invention with respect to practical applications are shown in FIGS. 5, 6 and 7.

Referring to FIG. 2, the seal arrangement 40 comprises a rotating member 42 attached to a support member 44 which supports a sealing fin 46. The sealing fin 46 is mounted, in this conceptual arrangement, between two magnetic rings 48 and 50 and the magnetic rings 48, 50 being arranged to repel one another. These magnetic discs may be of segmented form to provide the necessary magnetic repulsion and/or mechanical flexibility. The sealing fin 46 is manufactured from a conducting material and is positioned at the mid point between the two magnetic rings 48 and 50. As the sealing fin 46 is manufactured to be thin, no flux is cut between the magnets 48 and 50 and therefore no drag is generated at the central position. As the sealing fin 46 is displaced from its central position the flux is cut and a restoring force is generated. This restoring force centralises the sealing fin 46 between the magnetic rings 48 and 50. The sealing apparatus 40 shown in FIG. 2 and FIG. 3 is arranged to provide a seal between a static structure 52 which could be envisaged as the casing of a turbine of a gas turbine engine, and the rotating structure 42. The magnetic rings 48 and 50 are rigidly connected together via a yoke 54 which is flexibly attached to the casing by one or more leaf springs 56 which allow the magnetic rings 48, 50 via their yoke 54 to move axially with respect to the rotating fin 46.

A number of pressure zones or chambers are located around sealing apparatus 40, which could be considered to be the high pressure and low pressure zones or chambers located within the compressor or turbine of a gas turbine engine. One side of the rotating fin 46 and attached structure is adjacent a high pressure zone or first chamber 60. The other side of the rotating member 42 and its attached sealing fin 46 is adjacent a low pressure zone or second chamber 62.

The relative position between the sealing fin 46 and the static structure 52 is altered during normal operation due to factors such as differential thermal expansion, centrifugal growth, and changes in pressure. The purpose of the seal is to prevent passage of fluid from the high pressure zone 60 to the low pressure zone 62. Forces are generated in the moveable segment by pressures around the elements and any bias which may be applied by the leaf springs 56.

As the forces produced by pressure changes increase, the magnetic restoring forces need to increase to accommodate such changes. If such forces generated by pressure differences on the seal 40 are reduced then the seal 40 can be more responsive and less expensive.

A second seal 64 is therefore located such that a seal between the high pressure zone 60 and low pressure zone 62 is not only provided by sealing fin 46 but also secondary seal 64. In this conceptual example of the present invention a secondary seal 64 comprises a second sealing fin 66 located outwardly from magnetic ring 50, this fin 66 would also be formed as a disc. The fin 46 is in sealing contact with secondary seal 68 which is attached to casing 52.

The main function of first sealing fin 46 is to maintain a suitable clearance gap thus accommodating displacement of the static member 52 or rotating member 42 in response to pressure changes and in general to any movement between said static member 52 and rotating member 42.

Pressure distribution around the seal may be controlled by effective positioning of the secondary seal 64. Without such a secondary seal 64 the main seal 40 is required to provide magnetic forces to counter large forces provided by pressure differences. The positioning of the secondary seal 64 as shown in FIGS. 2 and 3, provides a high pressure zone around the majority of the seal as shown. The pressure may be used to balance, or minimise, the forces which are generated. An offset force may also be provided by positioning of the secondary seal 64. This will have a significant effect on the required size, weight, stability and cost of the magnetic seal lands 48 and 50 and the other elements of the seal system.

Full pressure balancing may be obtained by arranging or positioning the secondary seal such that an area equal to half of the main seal land area is subject to the high pressure. The main seal land area is indicated by small letter 'a' and the secondary seal land area is indicated by small letter 'f'.

This concept can be understood more clearly by referring to FIG. 4 and by considering the equations set out below.

The force, F, on magnet 48 is derived as follows:

The forces on face a, Fa are defined by $$Fa = HPa$$

HP is high pressure and a is area of face a

The force on face b, Fb is defined by Fb=HPb, where b is the area of face b

The force on face c, Fc is defined by $Fc = \frac{1}{2}(HP+IP)c$, where c is the area of face c and IP is an pressure intermediate high pressure and low pressure, this is a simplifying assumption that the pressure IP is midway between pressure HP and pressure IP, $$\text{Opposing force} = HPb + \frac{1}{2}(HP+IP)c$$

The force on face b is balanced by the force on equivalent part of a and so for this calculation may be disregarded.

The term ½ (HP+IP) is used to give the average pressure over area c. This is an approximation only, but provides a reasonably good first order approximation. The force to the right on magnet 48 is therefore:

$$F_1 = HPc - \frac{1}{2}(HP+IP)c$$

Similarly the force, $F_2$, on magnet 50 is

The force on face e is balanced by the force on face g and may be disregarded.

$$F_2 = \frac{1}{2}(IP+LP)d - f\,HP - (d-f)LP \text{ (assuming } f < d\text{), } c = d$$

if a value of f=d/2 is used, then $F_1 + F_2 = 0$ i.e. the forces $F_1$ and $F_2$ are completely balanced.

Some forces will be generated by flow effects (Bernoulli etc.) and by imperfections in the balancing. Forces will also be needed to accelerate movement of the magnets and associated mechanism during rapid transients.

The area of pressure lands of the magnets 48 and 50 are reduced, as indicated by c and d and may be used to reduce the effect or imperfections by allowing the forces to act only on smaller areas. The seal still operates without the reduced land i.e. c=a, b=o, but higher forces may be generated, leading to the need for higher magnetic forces, size, weight, etc. The same principle may be used with other force generating mechanisms.

Thus it can be appreciated that changes in pressures as the yoke 54 moves axially, will produce forces which restore it to a position where equal gaps are achieved on either side of the sealing fin 46 thus providing a fully pressure balanced seal.

A practical application of the concept indicated in FIGS. 2, 3 and 4 is shown in FIGS. 5 and 6. In this embodiment of the invention a seal 70 similar to the conceptual arrangement shown in FIGS. 2, 3 and 4 is arranged to provide a seal between the fan rotor 71 and adjacent stator structure 73 of a gas turbine engine. The downstream end of the fan rotor is provided with a sealing fin 74 attached thereto by a bolt 76. This sealing fin 74 comprises a ring structure and is mounted radially between two ring magnets 77, 79. The sealing fin 74 being thin so as to provide a null-flux magnetic zone around the central region between ring magnets 77 and 79. The ring magnets 77, 79 are rigidly mounted on a yoke 78. The yoke 78 comprises a U shaped cut away portion 81 into which the sealing fin disc 74 protrudes. The yoke 78 is pivotaly mounted on the stator by a pivot point 80. This pivot point 80 allows rotational movement of said yoke and hence can control the sealing clearance 82 between said ring magnets 77, 79 and said sealing fin 74.

A secondary seal 84 is provided, and this secondary seal 84 comprises a hook type protrusion 86 on said stator structure 73 and a co-operating seal land 88 mounted on said yoke 78.

The positioning of this secondary seal 84 prevents low pressure air indicated in FIGS. 5, 6 and 7 by LP, flowing freely around the rear 90 of seal 70 thus allowing the rear of the seal to be provided within high pressure zone or chamber, HP. An intermediate pressure zone or chamber, IP, is formed around the downstream end 92 of the sealing fin 74.

The secondary seal 84 is positioned to follow an arc around the pivot point 80. This position of the secondary seal 84 is chosen to balance the rotational forces generated by the pressures around the pivot point 80. Using the pressure balance equation previously noted in this specification, it is clear that pressure balance can be obtained by arranging the secondary seal 84 to be provided with a seal land area calculated for pressure balancing.

FIG. 6 is a view of a seal according to the present invention, mounted within a gas turbine engine. A fan blade 95 is mounted on a fan disc 97 and seal apparatus 70 seals between the high pressure and low pressure zones.

Conventionally in magnetic levitating seals or air riding seals etc. a gap closing force is applied which is opposed by levitation. This requires large forces to be generated or maintained to overcome this closing force. The present invention reduces this closing force which allows the seal to be smaller, lighter and be provided by a lower cost structure. Such a seal arrangement also provides a possibility for a faster response to movements of the sealing structures. The present invention arranges two seals to operate in opposition with any pressure forces being totally or partially balanced.

FIG. 7 illustrates the further embodiment of the present invention whereby the magnets are replaced by an air riding seal system 94. Again this air riding seal 94 is provided to seal between a rotating rotor 96 comprising a sealing fin 98 extending there from and two halves 100 and 102 of the air riding seal 94, and a static casing 104. In this embodiment of the invention the two halves 100, 102 of the seal 94 are separated as the engine stops, thus preventing contact as the centring forces are lost. The two halves 100 and 102 are rings. Secondary seal 106 provides the pressure balancing as previously explained. The two halves 100, 102 of the seal system 94 are pushed apart by one or more springs 112, are located on locating pins 108 and are centralised by two sets of weaker springs 110. In operation, as the pressure increases and the engine is started, the two halves 100 and 102 are pushed together until they reach their normal operating clearance. At this stage, they move together as a pressure balance seal with additional centring forces provided by the air riding seal mechanism. It is envisaged that other mechanisms such as temperature activated, or bi-metallic structures could be provided to achieve retraction of the seals when not required.

Figure 8:
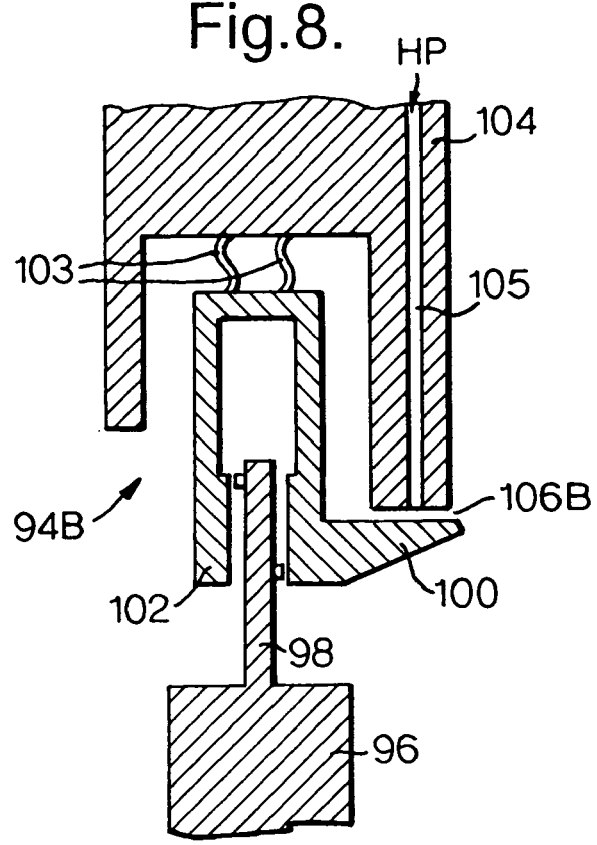
FIG. 8 is a diagrammatic view of another seal according to the present invention.

Another embodiment of the present invention is shown in FIG. 8 and this illustrates an air riding seal system 94B similar to that shown in FIG. 7. The air riding seal 94 is provided to seal between a rotor 96 comprising a sealing fin 98 extending therefrom, two interconnected halves 100 and 102 of the air riding seal 94 and a stator structure 104. The air riding seal 94 is mounted on the static structure 104 by leaf springs 103. The two halves 100 and 102 are rings. The secondary seal 106B provides the pressure balancing as previously explained. The secondary seal 106 is also an air riding seal. A passage 105 through the static structure 104 supplies, in operation, high pressure air to the secondary seal 106B to form an air riding seal/air bearing. The forces are essentially balanced and hence the air riding seal 94 may be operated with relatively large clearance to minimise change from debris.

Figure 9:
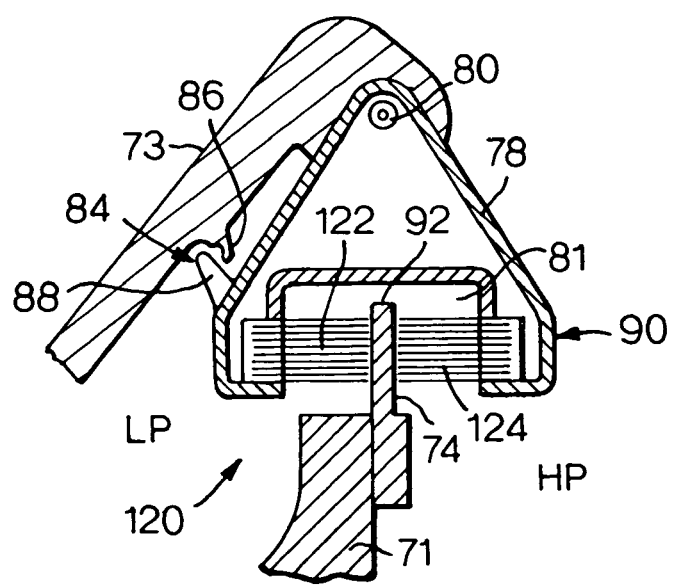
FIG. 9 is a diagrammatic view of an alternative seal according to the present invention.

An alternative embodiment of the present invention is shown in FIG. 9 wherein the magnets are replaced by a brush seal system 120 and is similar to that shown in FIG. 5. The brush seal 120 is provided to seal between a rotor 71 and static structure 73. A sealing fin 74 is attached to the rotor 71. The sealing fin 74 is mounted between two brush seals 122 and 124. The brush seals 122 and 124 are rigidly mounted on a yoke 78, the yoke 78 comprises a U shaped cut away portion 81 into which the sealing fin 74 extends. The yoke 78 is pivotally mounted on the stator structure 73 at a pivot point 80. The pivot point 80 allows rotational movement of the yoke 78 and hence can control the sealing clearance 82 between the brush seals 122 and 124 and the sealing fin 74. A secondary seal 84 is provided and comprises a protrusion 86 on the static structure 73 and a cooperating seal land 88 on the yoke 78. The brush seals 122 and 124 are annular. The sealing fin 78 may extend radially and the brush seals 122 and 124 extend axially or the sealing fin 74 may extend radially and the brush seals 122 and 124 extend radially.

Figure 10:
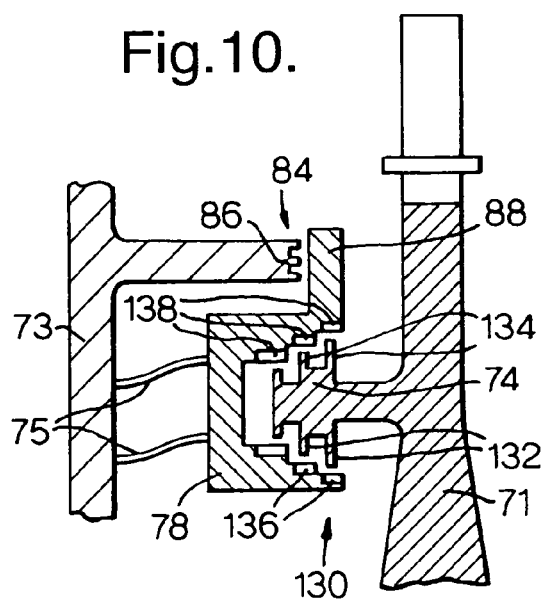
FIG. 10 is a diagrammatic view of a further seal according to the present invention.

A further embodiment of the present invention is shown in FIG. 10 and this illustrates a labyrinth seal system 130. The labyrinth seal 130 is provided to seal between a turbine rotor 71 comprising an axially extending annular fin 74 and a stator structure 73. A yoke 78 is mounted on the static structure 73 by leaf springs 75, and the yoke 78 comprises a U shaped cut away portion into which the sealing fin 74 extends. The leaf springs 75 allow radial movement of the yoke 78 and hence control the sealing fin 74 and the yoke 78. The sealing fin 74 has projections 134 extending radially outwardly and projections 132 extending radially inwardly which cooperate with abradable coatings 138 and 136 respectively on the surfaces of the yoke 78.

Figure 11:
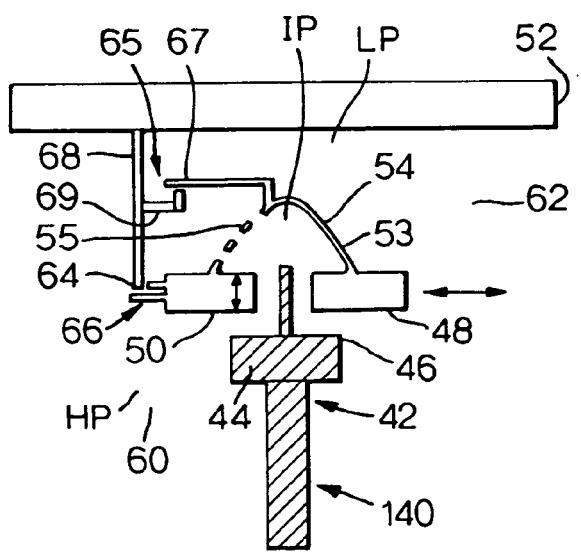
FIG. 11 is a diagrammatic view of an additional seal according to the present invention.

An additional embodiment of the present invention is shown in FIG. 11 and this illustrates a magnetic seal system 140. The magnetic seal system 140 is similar to that shown in FIGS. 2, 3 and 4. The magnetic seal system 140 differs in that the annular side wall 55 of the yoke 54, closest to the secondary seal 68 attached to the casing 52 is perforated whereas the annular side wall 53 of the yoke 54, furthest from the secondary seal 68 attached to the casing 52, is not perforated. The perforated annular side wall 55 of the yoke 54 has a smaller surface area than the unperforated annular side wall 53 of the yoke 54. A third seal 65 is provided such that the intermediate pressure IP zone is defined by the yoke 54, the second seal 64 and the third seal 65. The third seal 65 comprises a third annular sealing fin 67 extending from the yoke 54 from a position between the side walls 53 and 55 of the yoke 54, towards but spaced from the second seal member 68 and an annular hook shaped projection 69 extending from the second seal member 68 towards but spaced from the third annular sealing fin 67 to form the third seal 65. The difference in surface area between the side walls 53 and 55 of the yoke 54 results in the magnets 48 and 50 and yoke 54 initially moving towards the left until the rise in intermediate pressure moves the magnets 48 and 50 and yoke 54 towards the right and back to the balance position. The second seal 64 is positioned radially to balance the loads on the seal 140 at the central position.

Figure 12:
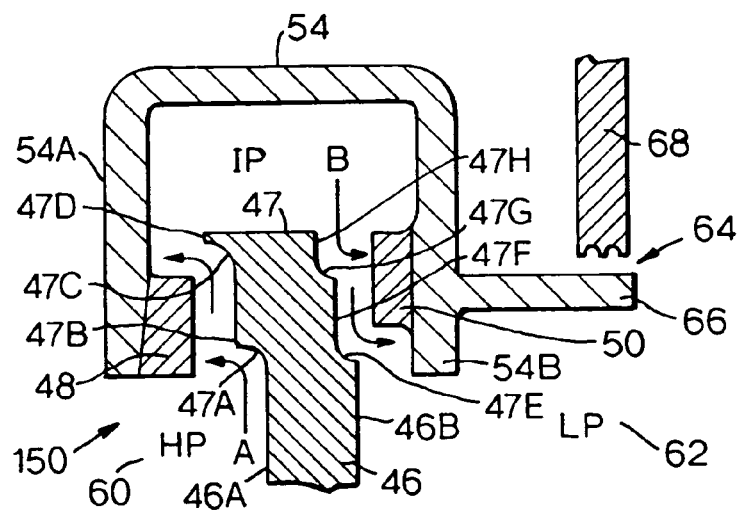
FIG. 12 is a diagrammatic view of a final seal

A further embodiment of the present invention is shown in FIG. 12 and this illustrates a magnetic seal system 150. The magnetic seal system 150 is substantially the same as that shown in FIGS. 2, 3 and 4. The magnetic seal system 150 differs in that the tip 47 of the sealing fin 46 is shaped to increase the aerodynamic lift between the sealing fin 46 and the sealing lands 48 and 50. The tip 47 of the sealing fin 46 is located substantially between the magnets 48 and 50. The sealing fin 46 has a first surface 46A facing the high pressure zone 60 and a second surface 46B facing the low pressure zone 62. The tip 47 of the sealing fin 46 is stepped such that there is a curved surface portion 47A interconnecting surface 46A with a planar surface portion 47B, which is parallel to surface 46A, and a curved surface portion 47C interconnecting surface portion 47B with a planar surface portion 47D, which is parallel to surface 46A and surface portion 47B. Surface portion 47B is nearer to the magnet 48 than surface 46A and surface portion 47D is nearer to the magnet 48 than surface portions 47B. Similarly there is a curved surface portion 47E interconnecting surface 46B with a planar surface portion 47F, which is parallel to surface 46B, and a curved surface portion 47G interconnecting surface portion 47F with a planar surface portion 47H, which is parallel to surface 46B and surface portion 47F. Surface portion 47F is further from the magnet 50 than surface 46B and surface portion 47H is further from the magnet 50 than surface portion 47F.

In operation fluid flows from the high pressure zone 60, to the low pressure zone 62 through the seal 150. The fluid initially flows in the direction of arrows A along the surface 46A of the sealing fin 46 towards the tip 47 of the sealing fin 46. The fluid is directed to flow away from the surface 46A by the curved surface portion 47A of the tip 47 towards the magnet 48. Additionally the curved surface portion 47C of the tip 47 directs the fluid away from the surface portion 47B towards the yoke portion 54A. This directing of fluid flow towards the magnet 48 increases the lift between the sealing fin 46 and the magnet 48 and yoke 54. Similarly the fluid flows in the direction of arrows B along the surface 47H of the tip 47 of the sealing fin 46 towards the surface 46B of the sealing fin 46. The fluid is directed to flow away from the surface 47H by the curved surface portion 47G of the tip 47 towards the magnet 50. Additionally the curved surface portion 47E of the tip 47 directs the fluid away from the surface portion 47F towards the yoke portion 54B. This directing of fluid towards the magnet 50 increases the lift between the sealing fin 46 and the magnet 50/yoke 54. This is because the fluid velocity in a small clearance gap is greater than the fluid velocity in a large clearance gap for the same mass flow and hence there is a greater force with a small clearance gap. The clearance gap is of the order of 80 μm in width and 10 mm long.

Although the present invention has described a stepped sealing fin for the magnetic seal it is equally possible to apply the principle to an air riding seal, brush seal and labyrinth seal.

Although the present invention has described the use of spring, or pivot, mounting of the connection between the seal lands to the static structure other suitable methods may be used.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A seal for providing sealing between at least two separate and differing pressure zones each exposed to differing sources of pressure and between a rotating structure and a non-rotating structure, said rotating structure having a high pressure side and an opposite, low pressure side and comprising first and second sealing means, the first sealing means comprising first and second seal lands positioned either side of a rotating seal member, said seal lands being connected together via connecting means, said connecting means being movably mounted on said non-rotating structure and arranged to be moveable so as to accommodate relative movement of said rotating and non-rotating structures, said second seal means being arranged and positioned to provide a seal between said non-rotating structure and the first seal land and being positioned between said high and low pressure zones such that the pressure around the first seal land is controlled, said first seal land and the non-rotating structure defining a first chamber, the first chamber being permanently connected to the high pressure zone, the connecting means and the first and second seal lands defining a portion of a second chamber, the at least a portion of the connecting means and the at least one of the first and second seal lands being imperforate such that the first chamber is isolated from the second chamber, said connecting means comprising a yoke which is flexibly attached to the non-rotating structure.

2. A seal as claimed in claim 1 wherein the two seal lands comprise two opposing magnets arranged to repel one another.

3. A seal as claimed in claim 2 wherein the magnetic sealing lands comprise rings.

4. A seal as claimed in claim 3 wherein the rings comprise segmented magnetic rings.

5. A seal as claimed in claim 4 wherein seals are provided between the segments of the magnetic rings.

6. A seal as claimed in claim 2 wherein said rotating seal member comprises a rotating sealing disc of a conducting material.

7. A seal as claimed in claim 6 wherein said rotating sealing disc is located in an intermediate pressure zone.

8. A seal as claimed in claim 1 wherein said rotating sealing member comprises a rotating sealing fin attached to a rotor of a gas turbine engine and said non rotating structure comprises an adjacent static structure of the gas turbine engine.

9. A seal as claimed in claim 8 wherein the rotor is a compressor rotor.

* * * * *